United States Patent
Dechassey et al.

(10) Patent No.: US 11,959,150 B2
(45) Date of Patent: Apr. 16, 2024

(54) WELDED STEEL SHEETS, AND SHEETS THUS PRODUCED

(71) Applicant: ArcelorMittal, Luxembourg (LU)

(72) Inventors: Emmanuel Dechassey, Godella (ES); Christophe Silvy-Leligois, Godella (ES); Francisco Chicharro Herranz, Puerto de Sagunto (ES); Vicente Polo Mestre, Valencia (ES); Marie-Christine Theyssier, Metz (FR); Thierry Celotto, Villerupt (FR); Christine Kaczynski, Maizieres-les-Metz (FR); Thomas Dupuy, Le Ban Saint Martin (FR); Quang-Tien Ngo, Luxembourg (LU)

(73) Assignee: ArcelorMittal, Luxembourg (LU)

( * ) Notice: Subject to any disclaimer, the term of this patent is extended or adjusted under 35 U.S.C. 154(b) by 69 days.

(21) Appl. No.: 17/470,257

(22) Filed: Sep. 9, 2021

(65) Prior Publication Data
US 2022/0002833 A1 Jan. 6, 2022

Related U.S. Application Data

(62) Division of application No. 16/088,287, filed as application No. PCT/IB2017/000176 on Feb. 27, 2017.

(30) Foreign Application Priority Data

Mar. 25, 2016 (WO) .................. PCT/IB2016/000378

(51) Int. Cl.
| | | |
|---|---|---|
| C21D 9/46 | (2006.01) | |
| B21B 15/00 | (2006.01) | |
| B23K 11/00 | (2006.01) | |
| B23K 11/04 | (2006.01) | |
| B23K 26/20 | (2014.01) | |
| C21D 8/02 | (2006.01) | |
| C21D 9/50 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/08 | (2006.01) | |
| C22C 38/12 | (2006.01) | |
| C22C 38/14 | (2006.01) | |
| C22C 38/16 | (2006.01) | |
| C22C 38/18 | (2006.01) | |
| C23G 1/00 | (2006.01) | |
| B23K 103/04 | (2006.01) | |

(52) U.S. Cl.
CPC ............ *C21D 9/46* (2013.01); *B21B 15/0085* (2013.01); *B23K 11/0073* (2013.01); *B23K 11/04* (2013.01); *B23K 26/206* (2013.01); *C21D 8/0226* (2013.01); *C21D 8/0236* (2013.01); *C21D 9/50* (2013.01); *C22C 38/001* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C23G 1/00* (2013.01); *B23K 2103/04* (2018.08); *C21D 2211/008* (2013.01)

(58) Field of Classification Search
CPC . B21B 15/0085; B23K 11/0073; B23K 11/04; B23K 2103/04; B23K 26/206; C21D 2211/008; C21D 2261/00; C21D 8/0226; C21D 8/0236; C21D 9/46; C21D 9/50; C22C 38/001; C22C 38/02; C22C 38/04; C22C 38/06; C22C 38/08; C22C 38/12; C22C 38/14; C22C 38/16; C22C 38/18; C23G 1/00

See application file for complete search history.

(56) References Cited

U.S. PATENT DOCUMENTS

| | | |
|---|---|---|
| 3,163,564 A | 12/1964 | Satoru et al. |
| 5,578,143 A | 11/1996 | Koyama et al. |
| 6,066,212 A | 5/2000 | Koo et al. |
| 8,889,264 B2 | 11/2014 | Satoh et al. |
| 10,030,291 B2 | 7/2018 | Shiraki et al. |
| 2008/0199347 A1 | 8/2008 | Barges et al. |
| 2010/0300585 A1 | 12/2010 | Perlade et al. |

FOREIGN PATENT DOCUMENTS

| | | | |
|---|---|---|---|
| CN | 1111458 A | | 11/1995 |
| FR | 1309245 A | * | 11/1962 |
| FR | 1309245 A | | 11/1962 |
| FR | 2790009 A1 | | 8/2000 |
| GB | 1313577 A | | 4/1973 |
| JP | S59226159 A | | 12/1984 |
| JP | S60258413 A | | 12/1985 |
| JP | H07124611 A | | 5/1995 |
| JP | 2001335891 A | | 12/2001 |
| JP | 2002361314 A | | 12/2002 |
| JP | 2008156680 A | | 7/2008 |
| JP | 2008169452 A | | 7/2008 |

(Continued)

OTHER PUBLICATIONS

Search Report of PCT/IB2017/000176, dated Jun. 13, 2017.

*Primary Examiner* — Jenny R Wu
(74) *Attorney, Agent, or Firm* — Davidson, Davidson & Kappel, LLC

(57) ABSTRACT

A steel sheet that is welded and then cold rolled to a thickness between 0.5 mm and 3 mm, the deformation ratio created by cold rolling in the base metal is equal to $\varepsilon_{MB}$, for which the deformation ratio created by the cold rolling in the welded joint is equal to $\varepsilon_S$, where:

$$0.4 \leq \frac{\varepsilon S}{\varepsilon MB} < 0.7.$$

16 Claims, No Drawings

(56) References Cited

FOREIGN PATENT DOCUMENTS

| | | | |
|---|---|---|---|
| JP | 2010023099 | A | 2/2010 |
| JP | 2013036112 | A | 2/2013 |
| RU | 2216599 | C2 | 11/2003 |
| RU | 2403311 | C2 | 11/2010 |
| RU | 2430185 | C2 | 9/2011 |
| RU | 2436849 | C2 | 12/2011 |
| RU | 2463115 | C1 | 10/2012 |
| UA | 76347 | C2 | 7/2006 |

* cited by examiner

WELDED STEEL SHEETS, AND SHEETS THUS PRODUCED

This is a divisional of U.S. patent application Ser. No. 16/088,287 which is a National Phase of International Application PCT/M2017/000176, filed Feb. 27, 2017 and claims the benefit of International Patent Application PCT/M2016/000378, filed Mar. 25, 2016, all of which are hereby incorporated by reference herein.

The present invention relates to thin cold-rolled steel sheets or strips having high strength and formability for the manufacture of parts by shaping, particularly in the automotive industry.

BACKGROUND

Among families of high-strength steels used in automobile construction are in particular so-called "dual-phase" steels, high-formability ("HF") steels, martensitic steels, as well as press-hardening steels.

SUMMARY OF THE INVENTION

However, the manufacture of these thin sheets has the following problem: these sheets or these strips are made on continuous rolling mills as follows:
- semi-finished products, slabs or ingots, are hot rolled then coiled.
- after uncoiling, the hot-rolled sheets are welded, so as to ensure the continuity of the subsequent process steps, i.e., the end of one sheet is welded to the beginning of the next sheet. These welds are generally made by flash welding or by Laser welding
- the sheets or strips are pickled by passing through a suitable bath and then coiled. They are then rolled on a cold rolling mill and recoiled. Finally, they are continuously annealed and optionally coated. For example, a hot-rolled sheet of thickness $e_i=3$ mm can be cold rolled to a thickness of $e_r=1$ mm, by successive passages through rolling stands to obtain a cold-rolled sheet.

The total deformation or reduction undergone by the sheet during this cold rolling can be calculated by:

$$Ln\left(\frac{\text{initial thickness } ei}{\text{final thickness } ef}\right),$$

or in the case described here: $Ln(3) \sim 1.10$.
- the cold-rolled sheet then undergoes a treatment in a continuous annealing furnace.

In this conventional method, the weld is cold rolled in a single step by passage through a group of cold rolling stands, and undergoes a deformation which can be significant, especially when the initial thickness $e_i$ is high and final thickness of the sheet of is low.

Thus, the weld is naturally an area in which various singularities are concentrated:
- A geometrical singularity, as welding leads to a local variation in thickness in the welded joint. Although scraping methods may be implemented to remove a large part of the excess thickness, it is difficult to prevent the occurrence of a local geometric variation (excess thickness or inadequate thickness) in the welded joint.
- A metallurgical singularity, as the microstructure after heating and rapid cooling is different from the microstructure after hot rolling. In addition, the content of inclusions and precipitates is different in the weld and in the adjacent base metal. In the case of flash welding, there are also non-parallel drawing lines on the surface of the sheet resulting from the forging step after the flash welding step.
- A mechanical singularity, as the mechanical behavior of the welded joint under tension and bending, and its toughness, differ from the mechanical behavior of the adjacent base sheet.

These singularities explain why deformations are concentrated in welded joints during cold rolling. In some cases, these concentrations can lead to the initiation and propagation of defects that can cause the strip to fracture, which naturally would interrupt production and reduce productivity of industrial lines. Therefore, a method was sought to increase the efficiency of industrial facilities with regard to manufacturing grades of steel for automotive construction, in particular families of the following steels:
- dual-phase steels, wherein the structure includes martensite, optionally bainite, and ferrite, which combine high strength with significant potential for deformation. When subjected to deformation, their capacity for consolidation is very large, which enables good distribution of deformations in the event of a collision and achievement of a significantly higher yield point for the part after shaping. These steels are used particularly in applications for motor vehicle structural and safety parts, such as crossbars, side frames, braces, or wheel plates. The thickness of these cold-rolled sheets is typically between 0.5 mm and 3 mm. Requirements for lighter weight and lower energy consumption have increased the demand for dual-phase high-strength steels, i.e., those wherein the tensile strength Rm is between 600 MPa and 1180 MPa. Depending on the tensile strength Rm, which can range for example from 600 MPa to 1180 MPa, the composition of these steels includes, the contents being expressed as weight percent, $0.05\% \leq C \leq 0.17\%$, $1.1\% \leq Mn \leq 2.76\%$, $0.07\% \leq Si \leq 0.7\%$, $S \leq 0.008\%$, $P \leq 0.030\%$, $0.015\% \leq Al \leq 0.61\%$, $Mo \leq 0.13\%$, $Cr \leq 0.55\%$, $Cu < 0.2\%$, $Ni \leq 0.2\%$, $Nb \leq 0.050\%$, $Ti \leq 0.045\%$, $V \leq 0.010\%$, $B \leq 0.005\%$, $Ca < 0.030\%$, $N \leq 0.007\%$, the remainder being iron and unavoidable impurities due to processing.
- high-formability steels, which contain elements such as silicon and/or aluminum to stabilize austenite in a significant amount at room temperature may gradually be transformed into martensite during cold-forming operations or stresses, thereby obtaining significant consolidation. Found in particular among these high-formability steels are steels known as "CFB" (Carbide Free Bainite or bainite without carbide) and so-called "Q-P" steels obtained by a quenching step ("Quenching") and a partition step ("Partitioning") of carbon. Depending on the desired tensile strength, which can range, for example, from 690 MPa to 1180 MPa, the composition of these steels includes, the contents being expressed as weight percent, between 0.13% and 0.3% C, between 1.8% and 3.5% Mn, between 0.1% and 2% Si, between 0.1% and 2% Al, the content of Si+Al being between 1% and 2.5%, ≤0.010% N. Optionally, these steels can also contain Ni, Cr, and Mo such that Ni+Cr+Mo≤1%, and microalloying elements Ti, Nb, V each in an amount <0.1%, the remainder being iron and unavoidable impurities due to processing.

martensitic steels, which acquire their microstructure after cooling following continuous annealing. In the context of the application of these steels in the automotive industry, the range of thickness used for martensitic steels having tensile strength between 1200 MPa and 1700 MPa in the field of automobile construction, is commonly between 0.6 mm and 2 mm. The composition of these steels includes in particular, the contents being expressed as weight percent: between 0.10% and 0.30% C, between 0.40% and 2.20% Mn, between 0.18% and 0.30% Si, between 0.010% and 0.050% Al, between 0.0025% and 0.005% B. Optionally, these steels may also contain between 0.020% and 0.035% Ti, up to 0.10% Cu or Ni, and up to 0.21% Cr, the remainder being iron and unavoidable impurities due to processing.

press-hardening steels, which are steels that acquire their final microstructure on parts through heating in the intercritical or austenitic range followed by hot shaping and rapid cooling in the press equipment, which causes a martensitic and/or bainitic transformation. The typical range of thickness of these cold-rolled sheets is 0.6 mm to 3 mm. Depending on the final tensile strength desired, which can range, for example from 1000 MPa to 2000 MPa, the composition of these steels includes, the contents being expressed as weight percent, between 0.15% and 0.5% C, between 0.4% and 3% Mn, between 0.1% and 1% Si, <1% Cr, Ti<0.2%, Al<0.1%, B<0.010%, N<0.010%, optionally between 0.25% and 2%, Nb≤0.060%, the remainder being iron and unavoidable impurities due to processing.

Therefore, a method is sought that prevents the concentration of deformations in welded joints made before cold rolling and thereby minimizes the risk of fracture during rolling.

An object of the present invention provides a method applicable to the manufacture of dual-phase cold-rolled steel sheets, in particular those having tensile strength greater than 600 MPa, of high-formability steels having tensile strength greater than 690 MPa, of martensitic steels having tensile strength greater than 1200 MPa, and of steels for hot stamping.

There is also a need for thin sheets in a range of lesser thickness than is available through cold rolling conducted by passage through a given rolling mill, for which the maximum rolling force is by definition limited by the mechanical design of the rolling mill stands under consideration. In addition, rolling torque is limited by engine torque and reduction ratios.

Another object of present invention provides an economical manufacturing method, thereby avoiding costly modifications to existing rolling facilities, and in particular, to facilitate the manufacture of high-strength thin sheets, which are difficult to cold roll.

Thus, a further alternate or additional object of the present invention provides cold-rolled sheets in a wider range of thicknesses with respect to the rolling capacities of existing facilities.

DETAILED DESCRIPTION

The present invention provides a method for the manufacture of a cold-rolled steel sheet having a thickness $e_f$ between 0.5 mm and 3 mm, including the successive steps and in this order according to which at least two hot-rolled sheets of thickness $e_i$ are supplied and are then butt welded so as to create a welded joint (S1) with a direction perpendicular to the direction of hot rolling, then these at least two hot-rolled sheets are pickled by passing through a continuous bath, then they are cold rolled; and then in a step (L1) the assembly of at least two hot-rolled sheets is cold rolled and welded to an intermediate thickness $e_{int}$, the direction of cold rolling ($DL_1$) coinciding with the direction of hot rolling, the cold rolling being carried out with a reduction ratio $$\varepsilon_1 = Ln\left(\frac{e_i}{e_{int}}\right)$$

such that:

$$035 \leq \frac{Ln\left(\frac{ei}{e\ \text{int}}\right)}{Ln\left(\frac{ei}{ef}\right)} \leq 0.65,$$

then the welded joint (S1) is removed so as to obtain at least two intermediate cold-rolled sheets, then these at least two intermediate cold-rolled sheets are butt welded so as to create a welded joint (S2) having a direction that is perpendicular to the direction of hot rolling, and then in a step (L2), cold rolling is carried out on the assembly of at least two intermediate cold-rolled and welded sheets, to a final thickness $e_f$, the direction ($DL_2$) of the cold rolling step (L2) coinciding with the direction of rolling ($DL_1$).

The reduction ratio $\varepsilon_1$ is preferably such that: $0.4 \leq \varepsilon_1 \leq 0.8$.

In a preferred embodiment, the steel composition is that of a dual-phase type steel having tensile strength Rm greater than 600 Mpa.

Preferably, the steel composition includes, the contents being expressed as weight percent: 0.05%≤C≤0.17%, 1.1%≤Mn≤2.76%, 0.07%≤Si≤0.7%, S≤0.008%, P≤0.030%, 0.015%≤Al≤0.61%, Mo≤0.13%, Cr≤0.55%, Cu<0.2%, Ni≤0.2%, Nb≤0.050%, Ti≤0.045%, V≤0.010%, B≤0.005%, Ca<0.030%, N≤0.007%, the remainder of the composition being iron and unavoidable impurities due to processing.

According to another preferred embodiment, the steel composition is that of a high-formability steel, having tensile strength Rm greater than 690 MPa.

Preferably, the composition of the steel includes, the contents being expressed as weight percent: 0.13%≤C≤0.3%, 1.8%≤Mn≤3.5%, 0.1%≤Si≤2%, 0.1%≤Al≤2%, it being understood that 1%≤S1+Al≤2.5%, ≤0.010% N, and optionally Ni, Cr, and Mo, it being understood that Ni+Cr+Mo<1%, Ti≤0.1%, Nb≤0.1%, V≤0.1%, the remainder being iron and unavoidable impurities due to processing.

According to another preferred embodiment, the steel composition is that of a press-hardening steel for the manufacture of parts having tensile strength Rm greater than 1000 MPa.

Preferably, the composition of the steel includes, the contents being expressed as weight percent: 0.15%≤C≤0.5%, 0.4%≤Mn≤3%, 0.1%≤Si≤1%, Cr≤1%, Ti≤0.2%, Al≤0.1%, B≤0.010%, and optionally 0.25%≤Nb≤2%, Nb≤0.060%, the remainder being iron and unavoidable impurities due to processing.

According to another preferred embodiment, the steel composition is that of a martensitic steel having tensile strength Rm between 1200 and 1700 Mpa.

Preferably, the steel composition includes, the contents being expressed as weight percent: 0.10%≤C≤0.30%, 0.40%≤Mn≤2.20%, 0.18%≤Si≤0.30%, 0.010%≤Al≤0.050%, 0.0025%≤B≤0.005%, and optionally 0.020%≤Ti≤0.035%, Cu≤0.10%, Ni≤0.10%, Cr≤0.21%, the remainder being iron and unavoidable impurities due to processing.

According to a preferred embodiment, after welded joint (S1) has been removed, and before welded joint (S2) is created, said at least two intermediary cold-rolled sheets are coiled, then temporarily stored, and then uncoiled.

According to a particular embodiment, welded joint (S1) or welded joint (S2) is made by flash welding.

According to another particular embodiment, welded joint (S1) or welded joint (S2) is made by Laser welding.

The present invention also provides a steel sheet that is welded and then cold rolled to a thickness between 0.5 mm and 3 mm, the deformation ratio created by cold rolling in the base metal is equal to $\varepsilon_{MB}$, for which the deformation ratio created by the cold rolling in the welded joint is equal to $\varepsilon_S$, characterized in that:

$$0.4 \le \frac{\varepsilon S}{\varepsilon MB} < 0.7.$$

According to a preferred embodiment, the composition of the steel sheet that is welded and then cold rolled is that of a dual-phase steel having tensile strength Rm greater than 600 MPa.

Preferably, the steel composition includes, the contents being expressed as weight percent: 0.05%≤C≤0.17%, 1.1%≤Mn≤2.76%, 0.07%≤Si≤0.7%, S≤0.008%, P≤0.030%, 0.015%≤Al≤0.61%, Mo≤0.13%, Cr≤0.55%, Cu<0.2%, Ni≤0.2%, Nb≤0.050%, Ti≤0.045%, V≤0.010%, B≤0.005%, Ca<0.030%, N≤0.007%, the remainder of the composition being iron and unavoidable impurities due to processing.

According to another preferred embodiment, the composition of the steel sheet welded and then cold rolled is that of a high-formability steel, having tensile strength Rm greater than 690 MPa.

Preferably, the steel composition includes, the contents being expressed as weight percent: 0.13%≤C≤0.3%, 1.8%≤Mn≤3.5%, 0.1%≤Si≤2%, 0.1%≤Al≤2%, it being understood that 1%≤S1+Al≤2.5%, ≤0.010% N, and optionally Ni, Cr, and Mo, it being understood that Ni+Cr+Mo≤1%, Ti≤0.1%, Nb≤0.1%, V≤0.1%, the remainder being iron and unavoidable impurities due to processing.

According to another preferred embodiment, the composition of the steel sheet welded and then cold rolled is that of a steel for press-hardening for the manufacture of parts having tensile strength Rm greater than 1000 MPa.

Preferably, the composition of the steel includes, the contents being expressed as weight percent: 0.15%≤C≤0.5%, 0.4%≤Mn≤3%, 0.1≤Si≤1%, Cr≤1%, Ti≤0.2%, Al≤0.1%, B≤0.010%, and optionally 0.25%≤Nb≤2%, Nb≤0.060%, the remainder being iron and unavoidable impurities due to processing.

According to another preferred embodiment, the composition of the welded and then cold-rolled steel sheet is that of a martensitic steel, having tensile strength Rm between 1200 MPa and 1700 MPa.

Preferably, the steel composition includes, the contents being expressed as weight percent: 0.10%≤C≤0.30%, 0.40%≤Mn≤2.20%, 0.18%≤Si≤0.30%, 0.010%≤Al≤0.050%, 0.0025≤B≤0.005%, and optionally 0.020%≤Ti≤0.035%, Cu≤0.10%, Ni≤0.10%, Cr≤0.21%, the remainder being iron and unavoidable impurities due to processing.

According to a particular embodiment, the welded joint is flash welded.

According to another particular embodiment, the welded joint is Laser welded.

According to another embodiment, in a welded and then cold-rolled steel sheet, the general direction of the welded joint extends perpendicular to the direction of rolling.

A manufacturing method for a rolled sheet according to the present invention provides:

at least two hot-rolled steel sheets, having an initial thickness $e_i$, typically between 2 mm and 8 mm, are supplied. These sheets, also called strips, are obtained from continuously cast slabs or ingots which are then rolled on rolling mills made up of different rolling stands through which the sheets successively pass. Their length can be between 500 and 2000 m. These hot-rolled sheets are coiled within a temperature range appropriate for conferring a microstructure and a precipitation state suitable for cold rolling and subsequent annealing. Optionally, in order to reduce the hardness of the sheets for the purpose of facilitating subsequent cold rolling, a heat treatment at a temperature TR between 400° C. and 700° C. may be carried out by placing the coils in a base annealing furnace, the temperature TR being maintained between 5 minutes and 24 hours. The sheets are then uncoiled and, to make the subsequent process continuous, they are butt welded, i.e., joined together to form longer strips. Preferably, this welding is made by flash welding or by Laser welding. Welding conditions specific to these methods are then adapted to obtain welded joints of satisfactory quality, which results in minimization of geometrical defects often caused by a relative misalignment of the sheets before welding, minimization of elongated inclusions and difference in hardness between the welded joint and the hardness of the base metal, as well as minimization of a possible softened area in the Heat Affected Zone (HAZ) on either side of the joint plane. The welded joints thus created at this stage, which will be referred to generically as (S1), have a general direction perpendicular to the direction of hot rolling, and extend over the entire width of the sheets or the strips. These sheets or strips are pickled by being passed through an acid bath to remove scale formed on the surface of the sheet during previous steps.

in a first step denoted by (L1), the sheets are then cold rolled along their length in the following manner: by means of a first pass through a cold rolling mill consisting of several stands, the sheets are given a deformation ratio that results in an intermediate thickness $e_{int}$. In contrast to the prior art, rolling is not carried out to achieve the final thickness of the product, but rather to achieve an intermediate thickness. The direction of cold rolling is referred to as (DL1). After this first pass through all the stands of the cold rolling mill, the deformation $\varepsilon_1$ conferred by $$Ln\left(\frac{e_i}{e_{int}}\right).$$

rolling the sheet is: The inventors have put in evidence that the deformation ratio in this first stage is to be carried out as a function of the total deformation ratio calculated from the final thickness of and after all the cold rolling steps, so that the following inequality is observed:

$$0.35 \le \frac{Ln\left(\frac{ei}{e\,int}\right)}{Ln\left(\frac{ei}{ef}\right)} \le 0.65$$

In other words, the deformation applied in this first rolling step should be between 0.35 times and 0.65 times the total deformation associated with the entire cold-rolling process:
when this ratio is less than 0.35, the rolling of the product during the step following the intermediate step will be carried out with a greater degree of deformation, which increases the risk of premature fracture of the welded joint within the strip.

when this ratio is greater than 0.65, the rolling rate associated with the first step also leads to an increased risk of welded joint fracture.

After this first rolling step, welded joint (S1) is removed by a means known per se, for example, by cutting. In this way the welded joint that has been strained in step (L1) and which potentially could cause subsequent strip fracture during subsequent cold rolling is removed. This cut thus creates two intermediate cold-rolled sheets of annealed thickness $e_{int}$ in step (L1).

These sheets are then coiled and temporarily stored. They are then uncoiled in order to perform a butt-joining operation on the two sheets. This second welding step creates a welded joint (S2) having a general direction perpendicular to the cold rolling direction (DL1), over the entire width of the sheets.

Although this operation takes place under conditions that appear to be similar to those for welding (S1), it should be noted that the welding parameters for (S2) are actually different from those for (S1) as they are adapted to the thickness $e_{int}$, which is less than the thickness $\varepsilon_i$. In particular, the welding energy for (S2) is lower, which leads to narrower welded zones and the possible formation of softened areas in the HAZ with reduced width and amplitude. Thus, a welded joint (S2) is created whose strength and toughness provide increased tensile strength in the subsequent cold rolling step (L2). This rolling (L2) is carried out in a direction (DL2) identical to the direction (DL1) to a final thickness $e_f$ with a deformation ratio $\varepsilon_2$ conferred on the entire sheet equal to:

$$Ln\left(\frac{e_{int}}{e_f}\right)$$

The inventors also put in evidence that the surface roughness of the sheets obtained according to the conventional method, by passes through a set of rolling stands, and the roughness obtained according to the invention, by two passes through this set of stands, was similar. The implementation of the invention thus makes it possible to obtain products whose surface reactivity with regard to subsequent annealing is little changed, so that the settings of the annealing furnaces may be maintained.

The invention will now be illustrated way of the following non-limiting examples.

Example 1

A steel has been elaborated with a composition for the manufacture of a dual-phase type steel sheet shown in the Table below, expressed in weight percent, the remainder being iron and unavoidable impurities due to processing. This composition enables the manufacture of a dual-phase steel sheet having tensile strength Rm greater than 980 MPa.

TABLE 1

| Dual-phase Steel Composition (wt.-%) | | | | | | | | | | | |
| --- | --- | --- | --- | --- | --- | --- | --- | --- | --- | --- | --- |
| C | Mn | Si | S | P | Al | Mo | Cr | Ni | Nb | Ti | B |
| 0.075 | 2.49 | 0.284 | 0.001 | 0.013 | 0.158 | 0.085 | 0.295 | 0.015 | 0.024 | 0.036 | 0.0023 |

Steel sheets of width 1500 mm were hot rolled to a thickness $e_i$ of 3 mm. In order to make the process continuous, these sheets were flash welded under the following conditions (S1):

Spark distance: 9.5 mm

Forging distance: 2.5 mm

Welding cycle time: 9 s.

These welded hot-rolled sheets were then cold rolled to a thickness of 1 mm by two different methods:

Reference method R1: the sheets were directly cold rolled by a continuous rolling mill consisting of five rolling stands. The deformation conferred by rolling the sheet is:

$$Ln\left(\frac{3}{1}\right) \sim 1.10.$$

Method according to the invention I1: the sheets were cold rolled by a continuous rolling mill consisting of five rolling stands to an intermediate thickness $e_{int}$ of 1.6 mm. At this stage, the deformation $\varepsilon_1$ is equal to:

$$Ln\left(\frac{3}{1.6}\right) \sim 0.63.$$

Weld (S1) was removed by cutting, the sheets thus obtained were coiled and temporarily stored. These sheets were then uncoiled and flash welded together to create a welded joint (S2) under the following conditions:

Spark distance: 6.5 mm

Forging distance: 1.5 mm

Welding cycle time: 7 s.

After the excess thickness was removed from joint (S2) by machining, this sheet of thickness 1.6 mm was then cold rolled to a final thickness of of 1 mm. The deformation ratio conferred by this second rolling step (L2) is equal to:

$$Ln\left(\frac{1.6}{1}\right) \sim 047.$$

Thus, the ratio $$\frac{Ln\left(\frac{ei}{e\,int}\right)}{Ln\left(\frac{ei}{ef}\right)}$$

is equal to: ~0.57.

The microstructures of the welded joints at various stages (initial, intermediate, and final thicknesses) as well as the variation in Vickers microhardness in the direction across these joints, under a 500 g load, were characterized. Using these characteristics, it is possible to determine the initial width of the welded joint and the width of the joint after cold rolling, and thus to deduce the local deformation ratio of the welded joint conferred by cold rolling. Table 2 shows the difference Δ between the overall deformation ratio of the sheet determined from its variation in thickness, with the local deformation ratio of the welded joint S1 or S2, according to the method of manufacture (average of three tests).

TABLE 2

|  | Difference Δ in deformation ratio between the sheet and the welded joint |
| --- | --- |
| Method I1 | 0 |
| Method R1 | 0.07 |

For the conventional method, it is thus demonstrated that the welded joint is deformed 7% less than the adjacent sheet. Surprisingly, it is demonstrated that the method of the invention leads to a deformation ratio conferred by rolling that is nearly identical in the sheet and in the strip, thus reducing the risk of premature fracture in the welded joint due to the deformations being concentrated more particularly in this area.

In addition, Table 3 compares the width of the welded joints (measured at the level of the Heat Affected Zone) and their average hardness $HV_{0.5}$, measured on a sheet of 1 mm final thickness obtained either by the reference method R1 or by the method of the invention I1. For purposes of comparison, the hardness of the 1 mm thick sheet as well as the relative difference between the hardness of the welded joints and that of the sheet were also examined.

The microstructure of joints (S1) and (S2) is very predominantly martensitic with a small proportion of bainite.

TABLE 3

|  | Width of rolled welded joint (mm) | Hardness of rolled welded joint ($HV_{0.5}$) | Hardness of rolled sheet ($HV_{0.5}$) | Difference in relative hardness/ welded joint-rolled sheet |
| --- | --- | --- | --- | --- |
| Method I1 | 10.7 | 409 | 367 | 11.4% |
| Method R1 | 23 | 438 | 367 | 19.3% |

It is thus demonstrated that the method of the invention results in a welded strip with a narrower joint and for which the difference in hardness is smaller compared to the base metal than in the case of the reference method, this homogeneity contributing to reducing the risk of premature fracture in the welded joint during cold rolling.

Specimens 70 mm long and 5 mm wide taken parallel to the welded joints were used to measure tensile strength Rm and fracture strain A in 1 mm thick cold-rolled sheets manufactured by the reference method and the method of the invention. Results for welded joints and base sheet are presented in Table 4.

TABLE 4

|  | Rm (MPa) | A (%) |
| --- | --- | --- |
| Welded rolled sheet Method I1 | 1400 | 3.4 |
| Welded rolled sheet Method R1 | 1550 | 1 |
| Rolled sheet | 1390 | 3.7 |

Once again, the method according to the invention demonstrates that it is possible to obtain a high degree of homogeneity of mechanical properties in both the base sheet and the welded joint, which reduces the risk of fracture during cold rolling of the strip. Indeed, in the conventional method R1, the fracture strain of the welded joint is lower, which means that a local concentration of stresses could lead more easily to fracture. In the method of the invention, the plasticity reserve of the welded joint is higher and comparable to that of the base metal, so that the risk of fracture is significantly reduced.

In addition, surface roughness of sheets manufactured by conventional methods and the method of the invention was measured using a 3D roughness measurement.

The 3D images were processed using Mountains® software. Roughness profiles were analyzed according to ISO4287, images according to EN15178N. The results are shown in Table 5.

TABLE 5

|  | Ra (μm) |
| --- | --- |
| Rolled sheet Method I1 | 0.83 |
| Rolled sheet Method R1 | 0.88 |

It can be seen that the invention makes it possible to manufacture sheets whose surface roughness Ra is relatively unchanged, i.e., two passes through the rolling line did not change the roughness as compared to a single pass. Thus, we know that an increase in roughness increases emissivity during furnace annealing, which occurs after cold rolling. For example, in the case of an annealing furnace with direct flame heating that results in an oxidizing phase for the iron, a sheet with increased roughness is heated more quickly, which can affect recrystallization and precipitation kinetics and thus the final mechanical properties of the sheet. A change in roughness may therefore require annealing furnace settings to be changed.

However, as we have seen, roughness is relatively unchanged for a given steel composition and thickness, sheets rolled by a conventional method and sheets rolled by the process of the invention can be passed successively through an annealing furnace without changing its settings, which has the advantage of simplifying annealing furnace management.

Example 2

A press-hardenable steel was supplied, the composition of which, expressed as weight percent, is shown in Table 5, with the remainder being iron and unavoidable impurities due to processing.

TABLE 5

| C | Mn | Si | Al | Cr | Ti | B | N |
|---|---|---|---|---|---|---|---|
| 0.22 | 1.16 | 0.26 | 0.03 | 0.17 | 0.035 | 0.003 | 0.005 |

Steel sheets were hot rolled to a thickness et of 3.5 mm. In order to make the process continuous, these sheets were flash welded under the following conditions (S1):
Spark distance: 9.5 mm
Forging distance: 2.5 mm
Welding cycle time: 12 s
Annealing time after welding: 9 s The sheets were cold rolled in a continuous rolling mill consisting of five rolling stands to an intermediate thickness $e_{int}$=1.75 mm. At this stage, the deformation $\varepsilon_1$ is equal to:

$$Ln\left(\frac{3.5}{1.75}\right) \sim 0.69.$$

Weld (51) was removed by cutting, the sheets thereby obtained were coiled and temporarily stored. These sheets were then uncoiled and flash welded together to create a welded joint (S2) under the following conditions:
Spark distance: 6.5 mm
Forging distance: 1.5 mm
Welding cycle time: 7 s
Post-weld annealing time: 7 s After removing the excess thickness from joint (S2) by machining, this sheet of thickness 1.75 mm was then cold rolled to a final thickness of of 0.64 mm. The deformation ratio conferred by this second rolling stage (L2) is equal to:

$$Ln\left(\frac{1,75}{0,64}\right) \sim 1.$$

Thus, the ratio $$\frac{Ln\left(\frac{ei}{e\ int}\right)}{Ln\left(\frac{ei}{ef}\right)}$$

is equal to: ~0.41.

In these conditions, which are those of the invention, it is stated that the process does not cause any premature failure of the strip weld and that it is possible to manufacture thin gage sheets of this press hardenable steel.

The process according to the invention will be advantageously used to reduce the risk of strip failure during the manufacture of cold rolled Dual Phase and Trip Steels, of High Formability steels, of press hardening steels, cold rolled for the automotive industry.

It will be also advantageously employed for the manufacture of sheets in thinner thickness ranges than those obtained directly in a single rolling step by existing facilities.

What is claimed is:

1. A steel sheet welded and then cold rolled to a thickness between 0.5 mm and 3 mm, the steel sheet comprising:
   a base metal and a welded joint;
   a deformation ratio created by cold rolling in the base metal being equal to $\varepsilon_{MB}$;
   a deformation ratio created by cold rolling in the welded joint being equal to $\varepsilon_S$;

$$0.4 \leq \frac{\varepsilon S}{\varepsilon MB} \leq 0.7;$$

and
   a direction of the welded joint extending perpendicular to a direction of cold rolling.

2. The steel sheet as recited in claim 1 wherein the steel sheet has a tensile strength Rm greater than 600 MPa.

3. The steel sheet as recited in claim 1 wherein a composition of the base metal includes, as contents expressed as weight percent:
   0.05%≤C≤0.17%;
   1.1%≤Mn≤2.76%;
   0.07%≤Si≤0.7%;
   S≤0.008%;
   P≤0.030%;
   0.015%≤Al≤0.61%;
   Mo≤0.13%;
   Cr≤0.55%;
   Cu<0.2%;
   Ni≤0.2%;
   Nb≤0.050%;
   Ti≤0.045%;
   V≤0.010%;
   B≤0.005%;
   Ca<0.030%; and
   N≤0.007%,
   a remainder being iron and unavoidable impurities due to processing.

4. The steel sheet as recited in claim 1 wherein the steel sheet has a tensile strength Rm greater than 690 MPa.

5. The steel sheet as recited in claim 4 wherein a composition of the base metal includes, the contents being expressed as weight percent:
   0.13%≤C≤0.3%;
   1.8%≤Mn≤3.5%;
   0.1%≤Si≤2%;
   0.1%≤Al≤2%;
   1%≤Si+Al≤2.5%; and
   N≤0.010%;
   a remainder being iron and unavoidable impurities due to processing.

6. The steel sheet as recited in claim 5 wherein the composition of the base metal includes, the contents being expressed as weight percent:
Ni+Cr+Mo<1%;
Ti≤0.1%;
Nb≤0.1%; and
V≤0.1%.

7. The steel sheet as recited in claim 1 wherein the steel sheet is suitable for press-hardening for the manufacture of parts having tensile strength Rm greater than 1000 MPa.

8. The steel sheet as recited in claim 7 wherein the composition of the base metal includes, the contents being expressed as weight percent:
0.15%≤C≤0.5%;
0.4%≤Mn≤3%;
0.1≤Si≤1%;
Cr≤1%;
Ti≤0.2%;
Al≤0.1%; and
B≤0.010%;
a remainder being iron and unavoidable impurities due to processing.

9. The steel sheet as recited in claim 8 wherein the composition of the base metal includes at least one of, the contents being expressed as weight percent:
0.25%≤Nb≤2%; and
Nb≤0.060%.

10. The steel sheet as recited in claim 1 wherein the base metal is a martensitic steel with a tensile strength Rm between 1200 MPa and 1700 MPa.

11. The steel sheet as recited in claim 10 wherein the composition of the base metal includes, the contents being expressed as weight percent:
0.10%≤C≤0.30%;
0.40%≤Mn≤2.20%;
0.18%≤Si≤0.30%;
0.010%≤Al≤0.050%; and
0.0025≤B≤0.005%;
a remainder being iron and impurities due to processing.

12. The steel sheet as recited in claim 11 wherein the composition of the base metal includes at least one of, the contents being expressed as weight percent:
0.020%≤Ti≤0.035%;
Cu≤0.10%;
Ni≤0.10%; and
Cr<0.21%.

13. The steel sheet as recited in claim 1 wherein in the welded joint is a flash weld.

14. The steel sheet as recited in claim 1 wherein the welded joint is a laser weld.

15. The steel sheet as recited in claim 1 wherein the base metal is a dual phase steel.

16. The steel sheet as recited in claim 1 wherein the base metal is a TRIP steel.

* * * * *